Nov. 12, 1968   E. U. SOWERS III, ETAL   3,410,521
TAPERED GROOVE VALVE
Filed Oct. 21, 1965
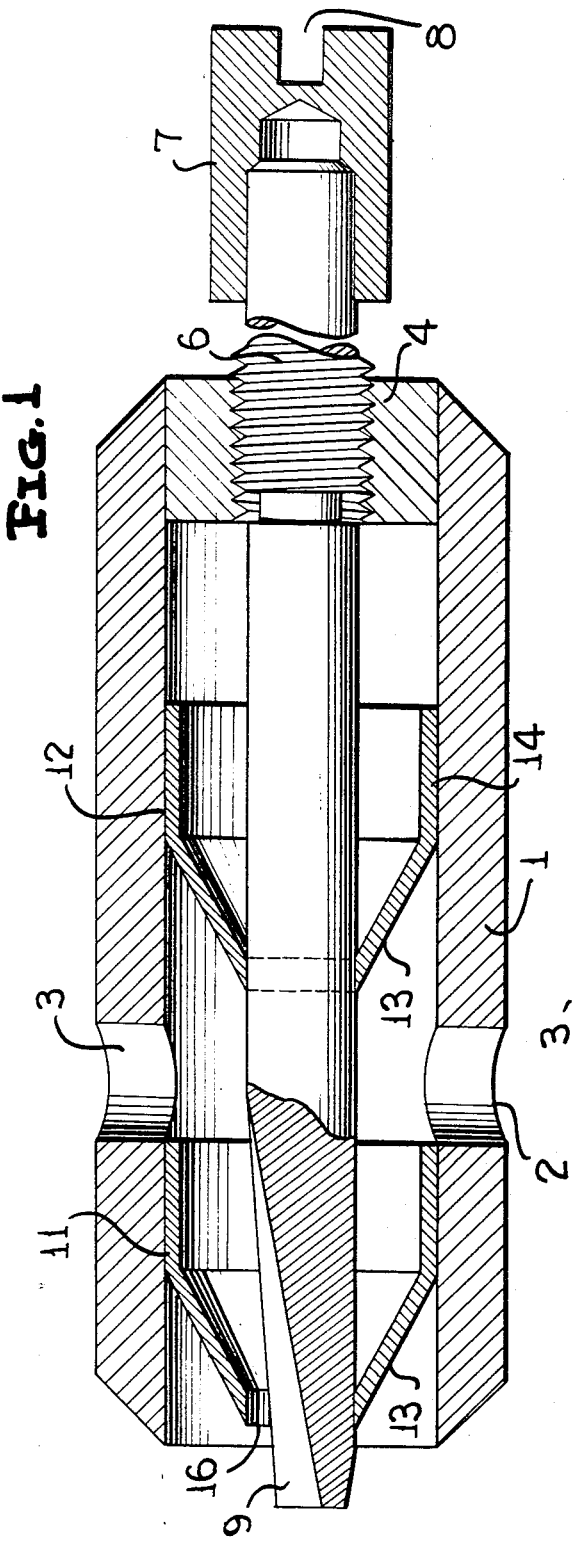
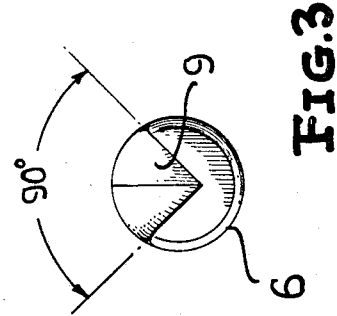
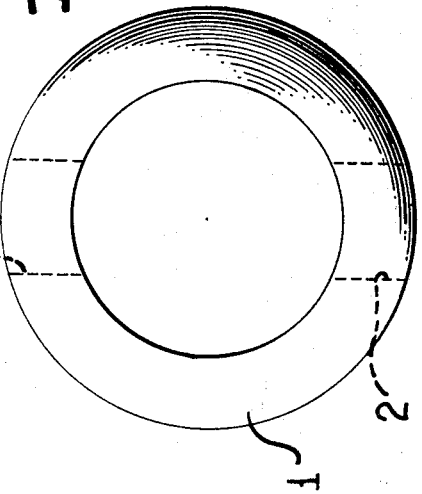
INVENTORS
EDWIN U. SOWERS, III
JOHN R. COLSTON
& GERALD R. SCHRADER
BY
Hurvitz + Rose
ATTORNEYS

United States Patent Office 3,410,521
Patented Nov. 12, 1968

3,410,521
TAPERED GROOVE VALVE
Edwin U. Sowers III and John R. Colston, Silver Spring, and Gerald R. Schrader, Adelphi, Md., assignors to Bowles Engineering Corporation, Silver Spring, Md., a corporation of Maryland
Filed Oct. 21, 1965, Ser. No. 500,029
19 Claims. (Cl. 251—205)

ABSTRACT OF THE DISCLOSURE

This invention is directed to a V-groove valve with a threaded shaft supported within the valve body by two conical shaped spring metal members.

---

The present invention relates to valves and, more particularly, to small inexpensive, highly accurate, presettable valve devices.

The field of pure fluid systems has provided a demand for small valve devices having the aforesaid and additional characteristics to be described subsequently. Pure fluid systems are often laid out as a pattern of channels formed in a plate in which the channels are grouped to provide various types of pure fluid amplifiers, flip-flops and related devices interconnected by means of appropriately designed channels. An exampel of such a device having this construction can be found in a patent application of John R. Colston, filed July 5, 1963, for "Turbine Speed Control," Ser. No. 293,108, now U.S. Patent No. 3,292,648, having numerous interrelated amplifiers and other pure fluid devices formed as channels in a single plate. Numerous of these devices operate with different supply and bias pressures and it is conventional to supply these various pressures from a single pressure supply by means of a manifold placed over and in sealing relationship with the plate containing the integrated circuits. A main pressure supply is brought into the manifold and various channels branch out from this input supply to the various power nozzles, control orifices, etc. of the fluid integrated circuit. In many instances, the supply pressures to power nozzles and/or control nozzles must be different from one another even though they come from a common input supply. Thus, it is desirable to be able to insert valves in the various passages branching from the input passage of the manifold and to accurately adjust the pressure drop across each of these valves.

Initially, it was attempted to employ conventional and unconventional needle valves in the manifold so as to provide the necessary pressure drops. However, it was found that no needle valve was available that could meet all of the criteria necessary for such use. Specifically, for an integrated fluid apparatus to operate properly, the pressures supplied to various elements and various nozzles of various elements must be maintained relatively constant over extended periods of time and in the presence of vibration, shock, large temperature excursions, dirt in the supply lines, and related factors. Also, the requirements of the circuit are such in numbers of valves that the individual valves must be quite cheap and also must have the non-linear pressure-flow characteristics associated with an orifice rather than a laminar flow device for reasons to be described subsequently.

It was determined that the necessity to render the valve relatively insensitive to dirt in the line was an absolute function of the basic configuration of the variable valve orifice, and therefore, it was decided to employ a V-groove valve of the general type described in U.S. Patent No. 2,980,392 and determine if such a valve could be made to meet the other requirements set forth above. The reason for using the valve having a V-groove is that such a valve has a maximum concentrated area of valve opening for any particular opening. In the needle valve, the metering opening at any given setting is in the form of an annulus and the total area is a function of the radius of the annulus; that is, the outside radius less the inside radius, times the average circumferential length. Thus, for any given area of opening, the radial length of the orifice is quite small relative to the total area and is susceptible to clogging. In a V-groove valve, the area of the orifice at any particular setting is concentrated in one location so that the minimum dimensions in any setting are always larger than the minimum dimensions for a needle valve for a corresponding area of opening.

Known V-groove valves do not meet the rigid requirements of the valve necessary for use in the manifolding systems of pure fluid integrated circuits, since they do not exhibit satisfactory temperature stability characteristics nor are they insensitive to shock or vibration or area change with time.

It is an object of the present invention to provide an adjustable V-groove valve which is stable with time, insensitive to wide variations in temperature and to shock and vibration and which is inexpensive to manufacture.

It is another object of the present invention to provide a V-groove valve having the characteristics of an orifice, which valve is inexpensive to manufacture and is insensitive to temperature variations, shock, vibration and creep with time.

The above and still further objects, features and advantages of the present invention will become apparent upon consideration of the following detailed description of one specific embodiment thereof, especially when taken in conjunction with the accompanying drawings, wherein:

FIGURE 1 is a cross-sectional view of the assembled apparatus of the present invention;

FIGURE 2 is a front view of the barrel or outer member of the device; and

FIGURE 3 is a front view in elevation of the shaft illustrating the V-groove forming the inclined orifice.

Referring specifically to FIGURES 1 through 3 of the accompanying drawings, the valve of the present invention comprises a hollow, cylindrical body 1 having diametrically opposed circular apertures or holes 2 and 3 drilled through the cylindrical wall of the body 1 at a point closer to one end than the other. A circular nut 4 is secured in the one end of the hollow, cylindrical body 1, the right end as viewed in FIGURE 1 of the drawings, this being the end from which the holes 2 and 3 are farthest. The nut 4 receives a threaded portion of a shaft 6 having secured to one end, again the right end as viewed in FIGURE 1, a slotted head member 7 having a slot 8 adapted to receive a screwdriver. When the shaft 6 is rotated, it translates along its axis. The end of the member 6 remote from the slotted head member 7; that is, the left end of the member 6 as viewed in FIGURE 1, has a tapered V-groove 9 formed therein. The tapered V-groove provides the variable metering orifice of the apparatus of the present invention.

The shaft 6 is supported by two conical members 11 and 12 secured interiorly of the hollow member of body 1. The members 11 and 12 are substantially identical and each comprises a conical portion 13 and an annular portion 14 with the conical portion tapering towards the left end of the device as viewed in FIGURE 1. The members 11 and 12 are drilled or provided with a central opening 16 through the apices which openings 16 are adapted to receive the shaft 6.

In use, fluid under pressure is supplied to the device through the V-groove 9 and thence through one or both of the holes or apertures 2 and 3 to one or more further channels. Pressure is supplied in this direction so that the clamping force on the shaft 6 by members 11 and 12 is increased as pressure rises. Metering is effected by the area of the opening between the solid portions of the rod 6 and the circular surface defining opening 16 in the member 11.

One of the primary features of the valve responsible for attaining the desired characteristics is the use of the members 11 and 12. The members 11 and 12 are formed of a relatively high temperature spring material and the diameters of the openings 16 are slightly smaller than the outside diameter of the adjacent portions of the shaft 6. As a result, when the shaft is pushed from the right to the left through the openings 16 in the members 11 and 12, the conical portions 13 of the members 11 and 12 expand resiliently and tightly bind the shaft, thus rendering the device insensitive to shock, vibration and creep.

The use of the members 11 and 12 to rigidly hold the shaft 6 renders the device considerably cheaper than would otherwise be possible since accurate threads on the members 4 and 6 are not required. The threads may be relatively loose; that is, tolerances are not very tight because the members 11 and 12 holding the shaft 6 under relatively large spring tensions and eliminate the necessity to rely on the threads for holding the position of the device.

The use of two different and spaced members, each of which holds the shaft under relatively high degree of spring tension permits the use of relatively short length of contact at each of the points. As previously indicated, it is necessary for the device of the present invention to have the characteristics of an orifice. There two reasons for this requirement: First of all, the valve of the present invention in the use for which it is designed will normally be arranged in series with another orifice. It is highly desirable therefore that the valve have the same characteristics as an orifice so that as various parameters in the system change, the pressure change across the metering opening of the valve has the same characteristic as the openings with which it is in series. A second reason for requiring the opening to have the characteristics of an orifice is the necessity for temperature stability. It is known that, if pressure is a linear function of the quantity of fluid flowing therethrough, the flow is sensitive to temperature changes since the flow through the opening varies with the viscosity of the fluid and the viscosity varies, of course, with temperature. A device having a characteristic of this type is one in which at least relatively laminar flow is developed through the opening, such as in a capillary tube. In an orifice, however, the pressure drop across the orifice is a function of the square of the quantity of fluid flowing therethrough. Under these circumstances, the pressure drop across the orifice is insensitive to the viscous effects and therefore is insensitive to temperature. Thus, the valve must display orifice characteristics which require a short, line-contact between the member 11 and the shaft 6. This is achieved in accordance with the present invention by employing two relatively rigid supports, only one of which contributes directly to the metering function.

Temperature stability of prior art devices is also affected by elongation and contraction and radial expansion and contraction of the various elements of the valve. Temperature insensitivity of the present device to radial expansion and contraction is achieved because the member 11 spring loads the shaft 6 and variations in temperature, although they may tend to increase and decrease this loading cannot completely relieve the loading and, in consequence, have substantially no effect upon the area of the orifice through which fluid flows. In a needle valve, the radial expansion and contraction of the various members affect the radius of the opening and thus vary the opening with temperature changes. Also in a conventional V-groove valve where the center shaft is not spring loaded, such as when a conventional O-ring is employed, the O-ring may expand into the V-groove of the metering shaft due to temperature increase, thus changing the metering opening. Also under these conditions, the O-ring is damaged upon rotation of the shaft. Other problems in conventional V-groove valves related to the use of elastomers for the O-rings and packings around the shaft. Rotation of the shaft twists these members while translation thereof compresses them. As the O-rings and packings unwind and expand to relieve the stored forces therein, they rotate and translate the shaft changing the orifice size. In the present device, there are no elastomers in the seals and neither of the above difficulties arise.

As to the effects of longitudinal expansion and contraction, severe changes in temperature do tend to lengthen or shorten the shaft 6, depending upon the direction of temperature deflection. In the present case, the distance between the points of contact of the members 11 and 12 with the shaft 6 is of concern rather than from the opening 16 to the threads on the shaft 6 at the nut 4. This is true since changes in length between member 12 and the threads of members 4 and 6 is taken up in the play between the threads of the members 4 and 6. Thus, the length of the material having an effect upon temperature stability is considerably shortened in the arrangement of the present invention relative to those of the prior art. If extremes in temperature are to be encountered in the use of the valve, it can be rendered quite insensitive, even to such extremes by fabricating the members 1 and 6 from materials having the same or similar temperature coefficients of expansion. Since the distance between the points of contact of the members 11 and 12 with the body 1 and with the shaft 6 are the same, linear expansion or contraction of the devices; that is, the members 1 and 6, are the same and there is very little or no shift in position between the member 6 and the member 11.

As an indication of the degree of temperature stability which can be obtained with the apparatus of the present invention, tests were run on a valve as illustrated in FIGURE 1 wherein the hollow cylindrical member 1 was fabricated from brass and the rod or shaft 6 was fabricated of steel. The members 11 and 12 were fabricated of beryllium-copper, which had been heat-treated to impart spring-like characteristics to the material. In such a test, the valve was placed in series with a downstream load equal to approximately one-half the maximum opening of the valve. The supply pressure to the V-groove 9 was 30 p.s.i.g. and the valve was cycled from temperatures of 40° F. to 225° F. over two cycles. Each temperature was maintained for fifteen minutes and the downstream pressure; that is, the pressure downstream of the orifice 16, was measured. The tests were started at 40° F. and the downstream pressure was 22.2 p.s.i.g. The temperature was then cycled to 225° F. and the downstream pressure fell to 22.1 p.s.i.g. The valve was again returned to 40° F. at which time the downstream pressure was found to be 22.2 p.s.i.g. and thereafter was returned to 225° F. and the pressure was found again to be 22.1 p.s.i.g. Similar other tests conducted over a period of time were found to provide corresponding temperature stability.

It will be noted that the pressure deviation downstream was 0.1 p.s.i. over a temperature fluctuation of 185° F. Thus, the variation of pressure over the 185° temperature fluctuation was less than one-half of one percent even though the materials of the barrel 1 and the shaft 6 have different temperature coefficients of expansion. Further, the pressure readings were found to be insensitive to vibration and shock and it was indicated in the temperature tests to have long-term stability. Further tests performed on the valve have shown that it has the characteristics of an orifice which, of course, is borne out by the temperature insensitivity of the valve if by no other factor.

As stated above, the outside diameter of the opening 16 is smaller than the outside diameter of the shaft 6. As an example, if the outside diameter of the shaft is three-thirty-seconds of an inch, the orifices 16 have a diameter between .0927 and .0932. As previously indicated, the members 11 and 12 may be formed from beryllium-copper. Although it is not essential to employ such material, it has been found to be highly satisfactory for several reasons. First, such material, by appropriate heat treating, has spring characteristics imparted thereto. Secondly, the material is relatively soft so that, after a few turns of the shaft 6, the material wears in and conforms to the shaft binding it tightly at all locations about its periphery. Also, being a relatively soft material, fabrication of the individual elements 11 and 12 is relatively simple.

The entire assembly is quite cheap due to the ease of manufacture. In a typical process of manufacture, the barrel 1 may be readily drilled in its two locations 2 and 3 and the ends beveled as indicated in the drawings. The members 11 and 12 may be readily formed by stamping or turning on a lathe and then heat treated in conventional manner for three hours between temperatures of 600° F. to 900° F. and subsequently air cooled. The members 11 and 12 may then be inserted into the barrel using a high temperature epoxy resin. The resin must cure at a temperature below the annealing temperature of the beryllium-copper. After the members 11 and 12 have been inserted, they are reamed by a single reamer, thus rendering the alignment of the openings a simple matter and insuring the same diameter for both openings. The shaft 6 is initially grooved, threaded, heat treated if necessary and the nut 4 is threaded onto the shaft. The shaft is then pushed through the members 12 and 11, in that order, and the nut 4 is secured within the barrel 1 by a high-temperature epoxy resin, for instance. The slotted member may then be threaded onto the shaft 6 and again secured by epoxy resin.

The particular method of securing the various members is also determined by the temperature to which the valve will be eventually subjected. If unusually high temperature operation is expected, the barrel 1 and the shaft 6 would be formed from the same material, preferably steel or Invar, and the members 11, 12 and 4 would be secured to the barrel 1 by brazing. Also, the slotted member 7 would be secured to the shaft 6 by brazing. However, all of these techniques are conventional and quite inexpensive.

To provide an indication of the size of the valve tested, the barrel is slightly under one inch long and, as previously indicated, the maximum diameter of the shaft 6 is three-thirty-seconds of an inch. The maximum opening provided by such a valve with the V-groove slot formed as indicated in FIGURE 3 is approximately 16 x $10^{-4}$ square inches. Linear operation over the entire range of openings is achieved simply by rotation the shaft 6.

Although the valve is illustrated as employing two outlet holes 2 and 3, more or fewer holes may be employed depending upon the system for which the valve is designed.

While we have described and illustrated one specific embodiment of our invention, it will be clear that variation of the details of construction which are specifically illustrated and described may be resorted to without departing from the true spirit and scope of the invention as defined in the appended claims.

What we claim is:

1. A V-groove valve comprising a housing, a shaft positioned in said housing axially thereof, means providing threaded engagement between said housing and said shaft, a tapered V-groove formed in one end of said shaft support means for gripping said shaft, said support means including two generally hollow conical members fabricated from metallic spring material and having axial apertures extending through the apices thereof, said conical members being secured to said housing at spaced axial locations and receiving said shaft through the apertures therein, the size and shape of said shaft relative to the sizes and shapes of said apertures being such that both said conical members grip said shaft under sufficient spring tension to prevent incidental translations of said shaft relative to said housing, and at least one aperture extending through said housing between said conical members.

2. The combination according to claim 1 wherein said conical members are fabricated from thin spring material.

3. The combination according to claim 1 wherein said conical members are fabricated from beryllium-copper.

4. A valve comprising a housing, a shaft positioned in said housing axially thereof, means providing threaded engagement between said housing and said shaft, a tapered groove formed in one end of said shaft support means for gripping said shaft, said support means including two generally hollow conical members fabricated from metallic spring material and having axial apertures extending through the apices thereof, said conical members being secured to said housing at spaced axial locations and receiving said shaft through the apertures therein, the size and shape of said shaft relative to the sizes and shapes of said apertures being such that both said conical members grip said shaft under sufficient spring tension to prevent incidental translations of said shaft relative to said housing, and at least one aperture extending through said housing between said conical members.

5. The combination according to claim 4 wherein said conical members are tapered toward the grooved end of said shaft.

6. A valve comprising:

a housing;

a shaft having a longitudinal axis disposed interiorly of said housing;

means providing threaded engagement between said shaft and said housing for effecting translation of said shaft along its longitudinal axis relative to said housing in response to rotation of said shaft about said axis;

means for supporting said shaft interiorly of said housing independently of said means providing threaded engagement;

said means for supporting said shaft comprising a pair of generally hollow conical members fabricated of metallic spring material and having apertures at their apices;

means for securing said conical members to said housing with said apertures in alignment to receive said shaft; and wherein the size and shape of the periphery of the shaft relative to the sizes and shapes of said apertures is such that both said conical members grip said shaft under sufficient spring tension to prevent axial translation of said shaft unless initiated by rotation thereof;

said conical members with said shaft providing three fluid-isolated regions within said housing;

said housing having an inlet port and an outlet port defined therethrough, one of said ports being located in the one of said regions intermediate said two conical members, the other of said ports being located in another of said regions;

and wherein said shaft has a groove defined therein, said groove being tapered along at least a portion of the length of the shaft, said groove being disposed to provide variable fluid communication between said one and said another of said regions as a function of the axial position of said shaft in said housing.

7. The combination according to claim 6 wherein said valve has an effective operational range corresponding to the range of axial shaft positions over which said tapered groove is aligned with one of said apertures, and wherein the shaft is gripped by both said conical members over the entirety of said effective operational range.

8. The combination according to claim 7 wherein said conical members are fabricated from high temperature spring material.

9. The combination according to claim 8 wherein said material is beryllium-copper.

10. The combination according to claim 8 wherein said tapered groove has a V-shaped cross-sectional configuration.

11. The combination according to claim 8 wherein said groove extends from one end of said shaft, said one end of said shaft being disposed in said another of said regions of said housing throughout said effective operational range of said valve.

12. The combination according to claim 11 wherein said groove has a V-shaped cross-sectional configuration which varies in area along the length of said groove.

13. The combination according to claim 12 wherein the largest cross-sectional area segment of said groove is at said one end of said shaft.

14. The combination according to claim 13 wherein said housing and said shaft are fabricated from the same material.

15. The combination according to claim 13 wherein said conical members are tapered toward the grooved end of said shaft.

16. The combination according to claim 13 wherein said shaft is generally cylindrical and said apertures are generally circular.

17. The combination according to claim 8 wherein said housing and said shaft are fabricated from the same material.

18. The combination according to claim 8 wherein said one of said ports is an outlet port.

19. The combination according to claim 8 wherein said conical members have apices directed toward said another of said regions in said housing.

References Cited

UNITED STATES PATENTS

| | | | |
|---|---|---|---|
| 383,877 | 6/1888 | Gale et al. | 138—46 X |
| 2,336,653 | 12/1943 | Taylor | 138—46 X |
| 2,970,802 | 2/1961 | Ocampo | 251—172 |
| 2,980,392 | 4/1961 | Greenwood | 251—205 X |
| 3,073,349 | 1/1963 | Mitchell | 251—172 X |
| 1,919,856 | 7/1933 | McGeorge | 251—172 X |

FOREIGN PATENTS

| | | |
|---|---|---|
| 470,043 | 3/1952 | Italy. |
| 320,744 | 10/1929 | Great Britain. |

ARNOLD ROSENTHAL, *Primary Examiner.*